United States Patent
Crucs

(10) Patent No.: US 10,503,817 B2
(45) Date of Patent: Dec. 10, 2019

(54) SYSTEM AND METHOD FOR MULTI-PARTY DOCUMENT REVISION

(75) Inventor: Kevin M. Crucs, Copley, OH (US)

(73) Assignee: Crucs Holdings, LLC, Copley, OH (US)

(*) Notice: Subject to any disclaimer, the term of this patent is extended or adjusted under 35 U.S.C. 154(b) by 1374 days.

(21) Appl. No.: 13/005,209

(22) Filed: Jan. 12, 2011

(65) Prior Publication Data
US 2012/0179647 A1    Jul. 12, 2012

(51) Int. Cl.
*G06F 16/00* (2019.01)
*G06F 17/22* (2006.01)
*G06F 17/24* (2006.01)

(52) U.S. Cl.
CPC .......... *G06F 17/2288* (2013.01); *G06F 17/24* (2013.01)

(58) Field of Classification Search
CPC .............................. G06F 17/2288; G06F 17/24
See application file for complete search history.

(56) References Cited

U.S. PATENT DOCUMENTS

| | | | |
|---|---|---|---|
| 5,287,504 A | 2/1994 | Carpenter et al. | |
| 5,890,177 A | 3/1999 | Moody et al. | |
| 6,006,239 A | 12/1999 | Bhansali et al. | |
| 6,397,351 B1 | 5/2002 | Miller et al. | |
| 6,601,232 B1 | 7/2003 | Burba et al. | |
| 6,859,821 B1 | 2/2005 | Ozzie et al. | |
| 6,915,482 B2 | 7/2005 | Jellum et al. | |
| 7,249,314 B2 * | 7/2007 | Walker et al. ................ | 715/205 |
| 7,496,841 B2 | 2/2009 | Hadfield et al. | |
| 7,735,144 B2 * | 6/2010 | Pravetz et al. .................. | 726/30 |
| 9,396,279 B1 * | 7/2016 | O'Donnell .......... | G06F 17/3089 |
| 2003/0078880 A1 * | 4/2003 | Alley et al. ..................... | 705/38 |
| 2006/0136441 A1 | 6/2006 | Fujisaki | |
| 2006/0209351 A1 | 9/2006 | Saito | |
| 2007/0061382 A1 | 3/2007 | Davis et al. | |

FOREIGN PATENT DOCUMENTS

WO          0025245 A1    5/2000

OTHER PUBLICATIONS

Allen Wyatt's Wordtips menu interface, Multiple Document Users, http://word.tips,net/Pages/T000534_Multiple_Document_Users. html, Jan. 14, 2010, 2 pages, Sharon Parq Associates, Inc.

* cited by examiner

*Primary Examiner* — Usmaan Saeed
*Assistant Examiner* — Paul Kim
(74) *Attorney, Agent, or Firm* — Hahn Loeser & Parks, LLP

(57) ABSTRACT

A system and method providing a multi-party document revision capability. A master electronic document (MED) may be established on a central computer platform. The MED is embedded with an unalterable document identification code (DIC) which clearly identifies the single instance of the MED. Parties having permission to access, modify, and approve the MED on the central computer platform are each provided with a unique identifier code (UIC) which is associated with the DIC and, therefore, the MED. Any permitted party having an assigned UIC may access the MED and enter proposed changes to the MED on the central computer platform. However, each party associated with the MED has to approve any proposed change before the proposed change is automatically entered as a formally accepted change into the MED.

11 Claims, 5 Drawing Sheets

SYSTEM AND METHOD FOR MULTI-PARTY DOCUMENT REVISION

TECHNICAL FIELD

Certain embodiments of the present invention relate to electronic documentation. More particularly, certain embodiments of the present invention relate to systems and methods providing multi-party document revision of electronic documents.

BACKGROUND

Today, electronic document software (e.g., word processing software, spreadsheet software, presentation software) allows any party that makes a change to a document to also accept the change into the document. This can result in any number of problems when multiple persons are making changes to a document. For example, when two parties are negotiating a contract, a first party could make a change to the contract document at the last minute without notifying the second party. If the second party does not go back and thoroughly review the contract document, the change might remain, even though the second party is unaware of the change. As another example, an unscrupulous party could OCR (optical character read) a hard copy of a contract document that was sent to them by a first party, make modifications electronically, then print out the contract document again on a hard copy and try to pass it off as the original document.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

An embodiment of the present invention comprises a non-transitory computer-readable medium having computer-executable instructions for enabling the performance of a method of multi-party document revision. The method includes establishing a master electronic document, having an embedded and unalterable document identification code. The method further includes assigning a unique identifier code to each party of a plurality of parties having permission to edit the master electronic document, and associating the document identification code with each unique identifier code. The method also includes accessing the master electronic document and making a proposed edited change to the master electronic document using one of the unique identifier codes. The method further includes accessing the master electronic document and accepting or rejecting the proposed edited change using one of the unique identifier codes. The method also includes automatically entering the proposed edited change into the master electronic document as a formally accepted change only if each unique identifier code has been used to accept the proposed edited change. The method may further include making an electronic copy of the master electronic document, wherein the embedded document identification code automatically changes within the electronic copy rendering the electronic copy inaccessible to the plurality of parties for further editing and accepting. The method may also include making an electronic copy of the master electronic document, wherein the embedded document identification code automatically changes within the electronic copy rendering the electronic copy accessible to the plurality of parties as a read-only document. The method may further include automatically tracking the proposed edited change based the unique identifier code used for accessing the master electronic document and for making the proposed edited change. The method may also include automatically tracking the accepting or rejecting of the proposed edited change based on the unique identifier code used for accessing the master electronic document and for accepting or rejecting the proposed edited change.

Another embodiment of the present invention comprises a system for enabling multi-party document revision. The system includes a central computer platform and means for facilitating the establishment of a master electronic document, having an embedded and unalterable document identification code, on the central computer platform. The system further includes means for assigning a unique identifier code to each party of a plurality of parties having permission to edit the master electronic document and for associating the document identification code with each unique identifier code. The system also includes means for facilitating the accessing of the master electronic document and the making of a proposed edited change to the master electronic document using an assigned unique identifier code. The system further includes means for facilitating the accessing of the master electronic document and the accepting or rejecting of the proposed edited change using an assigned unique identifier code. The system also includes means for automatically entering the proposed edited change into the master electronic document as a formally accepted change only if each unique identifier code has been used to accept the proposed edited change. The system may further include means for facilitating the making of an electronic copy of the master electronic document, wherein the embedded document identification code automatically changes within the electronic copy rendering the electronic copy inaccessible to the plurality of parties for further editing and accepting. The system may also include means for facilitating the making of an electronic copy of the master electronic document, wherein the embedded document identification code automatically changes within the electronic copy rendering the electronic copy accessible to the plurality of parties as a read-only document. The system may further include means for automatically tracking the proposed edited change based on the assigned unique identifier code used for accessing the master electronic document and for making the proposed edited change to the master electronic document. The system may also include means for automatically tracking the accepting or rejecting of the proposed edited change based on the unique identifier code used for accessing the master electronic document and for accepting or rejecting the proposed edited change.

A further embodiment of the present invention comprises a non-transitory computer-readable medium having computer-executable instructions for enabling the performance of a method of multi-party document revision. The method includes establishing a master electronic document, having multiple distinctly defined sections and having an embedded and unalterable document identification code. The method further includes assigning a unique identifier code to each party of a plurality of parties, where each party has permission to edit one or more of the sections of the master electronic document, and associating the document identification code and the permitted one or more sections with each corresponding unique identifier code. The method also includes accessing a first permitted section of the master electronic document and making a first proposed edited change to the first permitted section of the master electronic document using a first unique identifier code assigned to a first party. The method further includes accessing the first permitted section of the master electronic document and accepting or rejecting the first proposed edited change using one of the unique identifier codes assigned to each party of the plurality of parties that has permission to access the first permitted section. The method also includes automatically entering the first proposed edited change into the first permitted section of the master electronic document as a formally accepted change only if each unique identifier code associated with the first permitted section has been used to accept the first proposed edited change. The method may further include accessing a second permitted section of the master electronic document and making a second proposed edited change to the second permitted section of the master electronic document using a second unique identifier code assigned to a second party. The method may also include accessing the second permitted section and accepting or rejecting the second proposed edited change using one of the unique identifier codes assigned to each party of the plurality of parties that has permission to access the second permitted section. The method may further include automatically entering the second proposed edited change into the second permitted section of the master electronic document as a formally accepted change only if each unique identifier code associated with the second permitted section has been used to accept the second proposed edited change. The method may also include making an electronic copy of a permitted section of the master electronic document, wherein the embedded document identification code automatically changes within the electronic copy rendering the electronic copy inaccessible to the plurality of parties for further editing and accepting. The method may further include making an electronic copy of a permitted section of the master electronic document, wherein the embedded document identification code automatically changes within the electronic copy rendering the electronic copy accessible to the plurality of parties as a read-only document. The method may also include automatically tracking the first and second proposed edited changes based on the first and second unique identifier codes. The method may further include automatically tracking the accepting or rejecting of the first and second proposed edited changes based on the unique identifier codes assigned to each party of the plurality of parties that has permission to access the first and second permitted sections.

Another embodiment of the present invention comprises a system for enabling multi-party document revision. The system includes a central computer platform and means for establishing a master electronic document, having multiple distinctly defined sections and having an embedded and unalterable document identification code, on the central computer platform. The system further includes means for assigning a unique identifier code to each party of a plurality of parties, where each party has permission to edit one or more sections of the master electronic document, and for associating the document identification code and the permitted one or more sections with each corresponding unique identifier code. The system also includes means for accessing a first permitted section of the master electronic document and for making a first proposed edited change to the first permitted section of the master electronic document using a first unique identifier code assigned to a first party. The system further includes means for accessing the first permitted section of the master electronic document and for accepting or rejecting the first proposed edited change using one of the unique identifier codes assigned to each party of the plurality of parties that has permission to access the first permitted section. The system also includes means for automatically entering the first proposed edited change into the first permitted section of the master electronic document as a formally accepted change only if each unique identifier code associated with the first permitted section has been used to accept the first proposed edited change. The system may further include means for accessing a second permitted section of the master electronic document and for making a second proposed edited change to the second permitted section of the master electronic document using a second unique identifier code assigned to a second party. The system may also include means for accessing the second permitted section of the master electronic document and for accepting or rejecting the second proposed edited change using one of the unique identifier codes assigned to each party of the plurality of parties that has permission to access the second permitted section. The system may further include means for automatically entering the second proposed edited change into the second permitted section of the master electronic document as a formally accepted change only if each unique identifier code associated with the second permitted section has been used to accept the second proposed edited change. The system may also include means for making an electronic copy of a permitted section of the master electronic document, wherein the embedded document identification code automatically changes within the electronic copy rendering the electronic copy inaccessible to the plurality of parties for further editing and accepting. The system may further include means for making an electronic copy of a permitted section of the master electronic document, wherein the embedded document identification code automatically changes within the electronic copy rendering the electronic copy accessible to the plurality of parties as a read-only document. The system may also include means for automatically tracking the first and second proposed edited changes based on the first and second unique identifier codes. The system may further include means for automatically tracking the accepting or rejecting of the first and second proposed edited changes based on the unique identifier codes assigned to each party of the plurality of parties that has permission to access the first and second permitted sections.

These and other advantages and novel features of the present invention, as well as details of illustrated embodiments thereof, will be more fully understood from the following description and drawings.

DETAILED DESCRIPTION

The terms "user" and "editor" as used herein mean an individual person capable of using a client computer to make a change to an electronic document, in accordance with the various embodiments of the present application. The term "party" as used herein means one or more individual users or editors, or a business entity represented by one or more individual users or editors. The term "software module", as used herein, refers to a small self-contained program of computer-executable instructions that performs a defined function or functions and is intended to operate within a larger program suite of other software modules.

Figure 1:
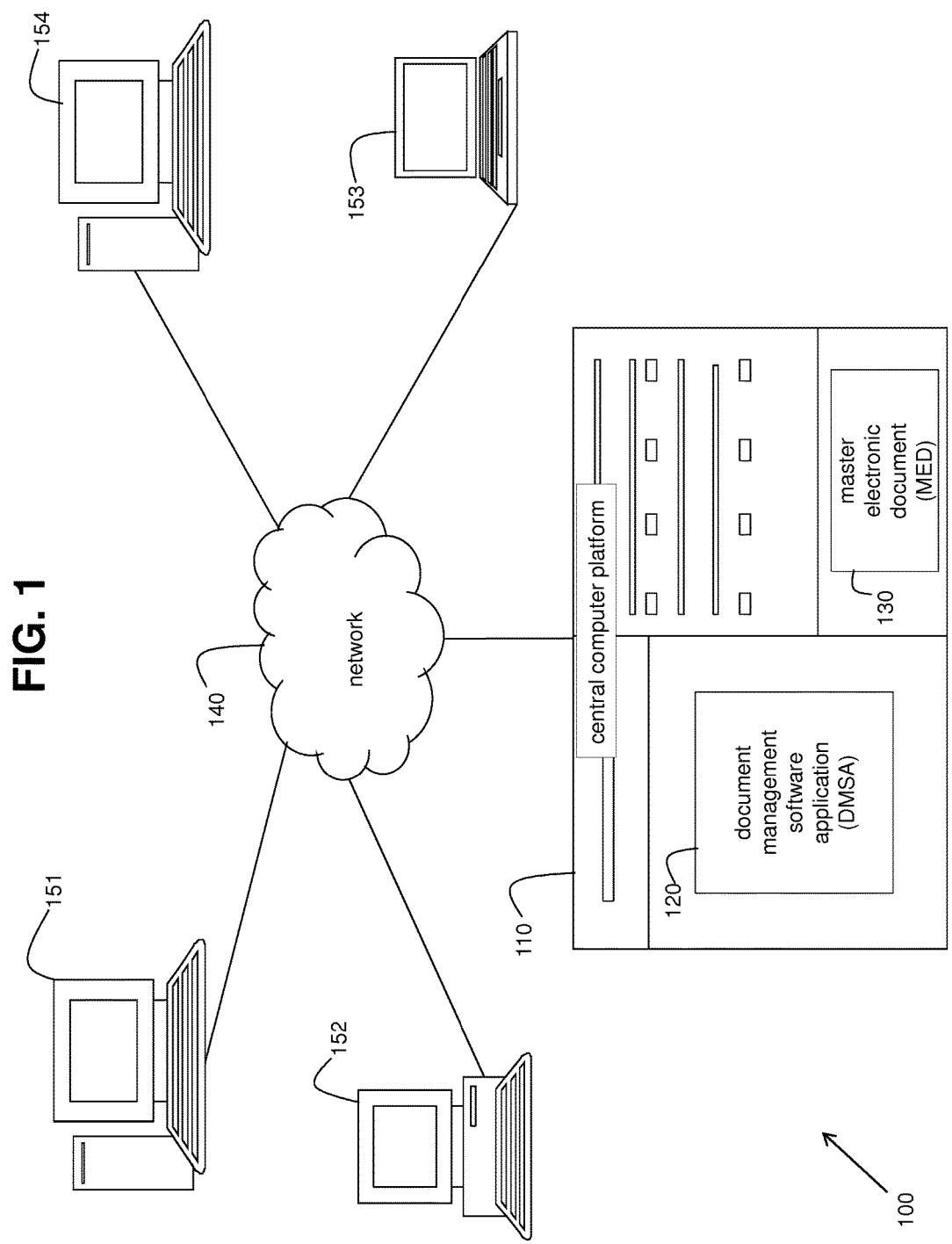
FIG. 1 illustrates an example embodiment of a system, having a central computer platform, for enabling multi-party document revision.

FIG. 1 illustrates an example embodiment of a system 100, having a central computer platform 110, for enabling multi-party document revision. The system 100 also includes a network 140 (e.g., an internal intranet or the Internet). The central computer platform 110 is a processor-based computer (with system memory, storage devices, program data, and associated software) and is operatively connected to the network 140. The central computer platform 110 hosts a document management software application (DMSA) 120 and one or more master electronic documents (MEDs) 130. A MED 130 may be in the form of a word processing document, a spreadsheet document, or a presentation document, for example. Other types of electronic documents are possible as well, in accordance with various embodiments of the present invention.

In accordance with an embodiment of the present invention, the central computer platform may be a server that is accessed by clients (e.g., editors) via the network 140. The DMSA 120 may also be stored on a non-transitory computer-readable medium, in accordance with an embodiment of the present invention. Such non-transitory computer-readable medium may include, for example, magnetic disks, optical disks, tape, RAM, ROM, CD-ROM, DVD, or any other removable or non-removable non-transitory medium which can be used to store the DMSA 120.

The system 100 further includes a plurality of client computers 151-154 operatively connected to the network 140. The client computers may be, for example, desk top personal computers (PCs), laptop PCs, or any other type of fixed or mobile processing device capable of connecting to the network 140 and accessing the central computer platform 110 via the network 140. Even though only four client computers are shown in FIG. 1, the system 100 may include fewer or more client computers at any particular time.

In accordance with an embodiment of the present invention, a user associated with a party (e.g., a business entity) may use one of the client computers (e.g., client computer 151 at the business entity site) to access a master electronic document (MED) 130 on the central computer platform 110 via the network 140 to edit the MED 130 and/or approve edits (changes) made by other parties to the MED 130. As is discussed later herein, such a party must have the requisite permission to access and edit the MED 130, or at least a section of the MED 130. In this way, various parties, each having permission to edit and/approve changes to the MED 130, may access the MED 130.

For example, the MED 130 may represent a contract between two parties. Each party has access to the MED 130 and each party may propose changes to the contract by editing the MED 130. However, as discussed later herein, a proposed edited change to the MED 130 does not become a formally accepted part of the MED 130 unless both parties accept (i.e., approve) the proposed change. Furthermore, all parties are limited to working with the same single instance of the MED 130 residing on the central computer platform 110. As a result, one party cannot easily take advantage of another other party by making changes to the MED 130 without the other party becoming aware of the changes, or by making an electronic copy of the MED 130, making changes, and representing the copy as the original document. Details of such protections are discussed later herein. In such a scenario, the central computer platform 110 may be located within a building of an impartial entity (e.g., a company that provides the multi-party document revision service) and the network 140 may be the Internet that allows communication between the central computer platform 110 and the various parties associated with the contract.

As another example, the MED 130 may represent a marketing document that several parties within the same business entity are preparing. Some of the parties may be from marketing and others may be from upper management, for example. Again, a proposed edited change to the MED 130 does not become a formally accepted part of the MED 130 unless all parties accept (i.e., approve) the proposed change, and all parties are limited to working with the same single instance of the MED 130 residing on the central computer platform 110. In such a scenario, the central computer platform 110 may be located within a building of the business entity and the network 140 may be an intranet that allows communication between the central computer platform 110 and the various parties within the business entity via client computers.

Figure 2:
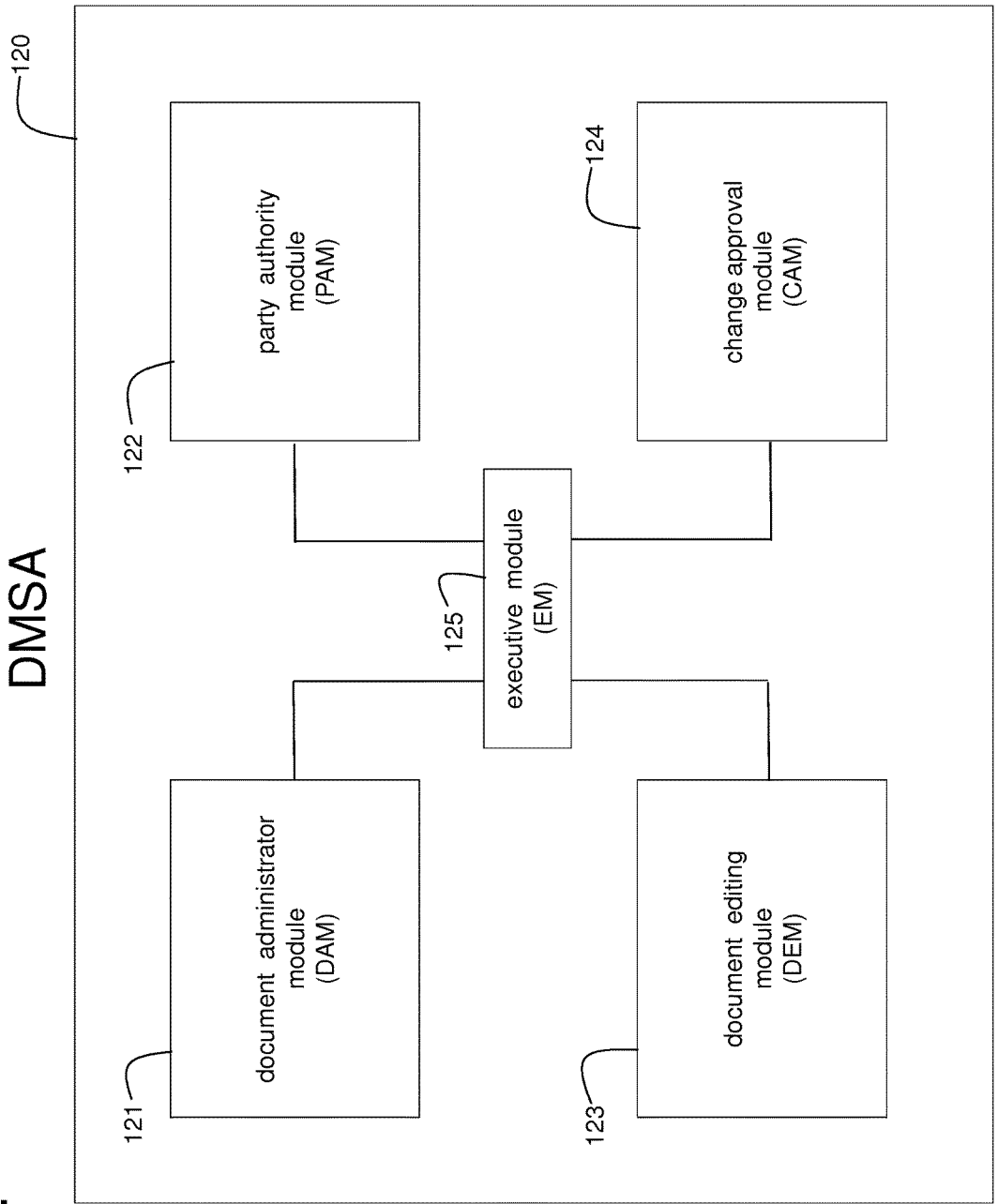
FIG. 2 is a functional block diagram of an example embodiment of a document management software application (DMSA) that runs on the central computer platform of the system of FIG. 1.

FIG. 2 is a functional block diagram of an example embodiment of a document management software application (DMSA) 120 that resides and runs on the central computer platform 110 of the system 100 of FIG. 1. The DMSA 120 includes several software modules including a document administrator module (DAM) 121, a party authority module (PAM) 122, a document editing module (DEM) 123, a change approval module (CAM) 124, and an executive module (EM) 125. The EM 125 operatively interfaces to each of the other software modules 121-124 and facilitates communication between the various software modules. The EM 125 also facilitates communication with clients via the network 140 and with the MED 130 on the central computer platform 110. The software modules 121-125 may be organized and reconfigured (e.g., combined or split up) into other software modules, in accordance with other various embodiments of the present invention, while preserving the overall functionality of the DMSA 120.

Figure 3:
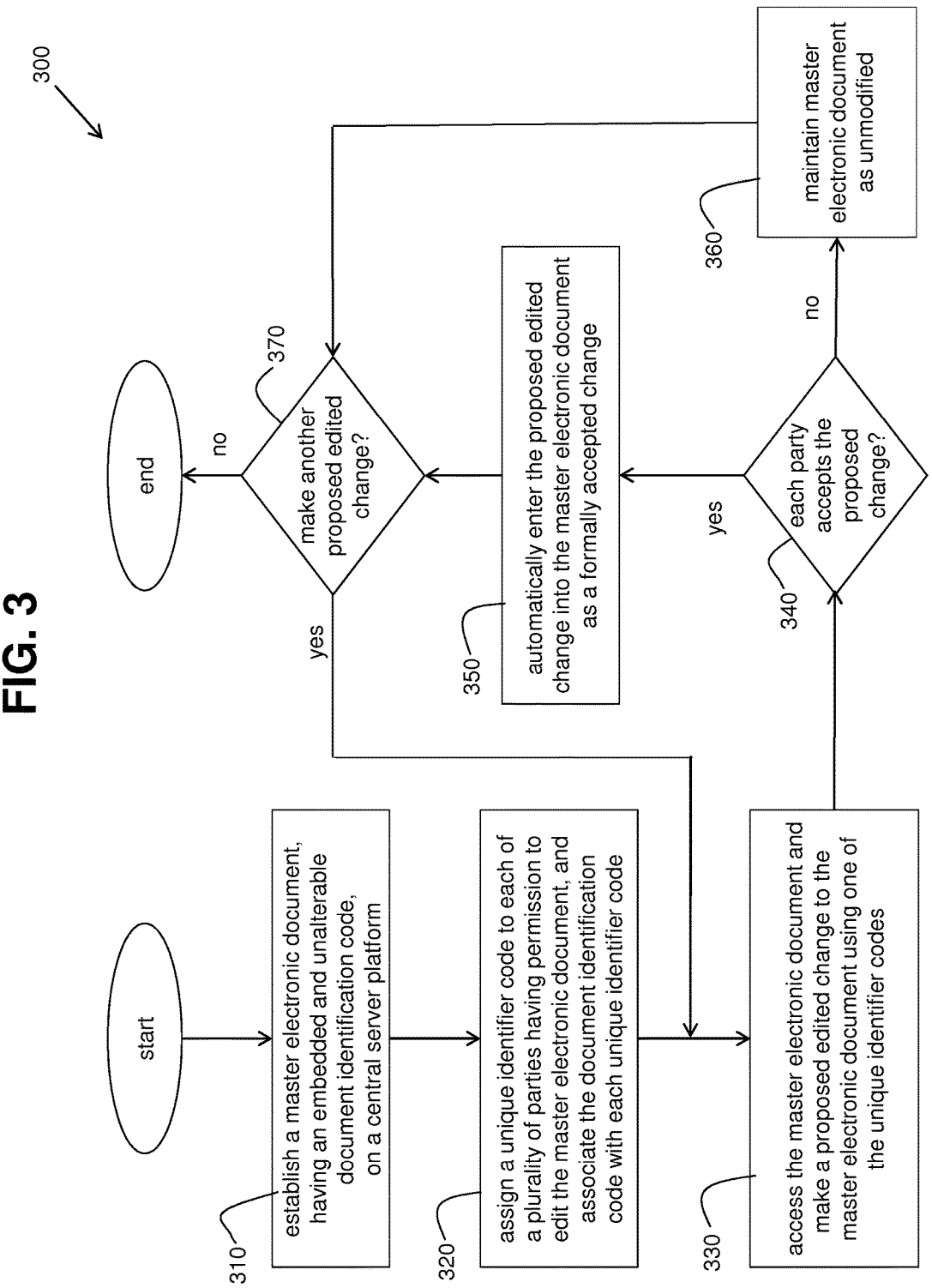
FIG. 3 is a flowchart of an example of a first embodiment of a method of performing multi-party document revision using the DMSA of FIG. 2 operating on the system of FIG. 1.

FIG. 3 is a flowchart of an example of a first embodiment of a method 300 of performing multi-party document revision using the DMSA 120 of FIG. 2 operating on the system 100 of FIG. 1. In step 310, a master electronic document (MED) 130 is established on a central computer platform 110. In accordance with an embodiment of the present invention, a party having permission to access the MED 130 uses a client computer (e.g., 154) to access the DMSA 120 on the central computer platform 110 via the network 140 and establishes or sets up the MED 130 on the central computer platform 110. The MED 130 has an embedded and unalterable document identification code (DIC). The DIC may be a numeric or alpha-numeric code, for example. Other types of codes are possible as well. A DIC may be implemented by a variety of methods including standard encryption methods, embedded application code methods, and public key encryption methods. Other methods are possible as well, in accordance with other embodiments of the present invention.

This initial version of the MED 130 may serve as a starting point or a baseline for a contract, for example, to be negotiated between two or more parties, including the party establishing the MED 130. Alternatively, a neutral party, which will not be part of the negotiation, may establish the baseline MED 130 on the central computer platform 110. The neutral party may be, for example, an arbitrator or a legal entity specializing in legal contracts. In accordance with an embodiment of the present invention, the step 310 is facilitated by the document administrator module (DAM) 121 via the executive module (EM) 125, thus establishing the baseline MED 130.

In step 320, a unique identifier code (UIC) is assigned to each party of a plurality of parties having permission to edit the MED 130, and the DIC of the MED 130 is associated with each UIC. Each party may use their assigned UIC to access the associated MED 130 using the DMSA 120 on the central computer platform 110. Each UIC may be in the form of a globally unique identifier (GUID) or an issued digital certificate, for example. In accordance with an embodiment of the present invention, the step 320 is facilitated by the document administrator module (DAM) 121 and the party authority module (PAM) 122 via the executive module (EM) 125, thus establishing which parties have access to the MED 130. As with step 310, step 320 may be initiated by one of the negotiating parties or by an arbitrator or a legal entity specializing in legal contracts, for example. Alternatively, step 320 may be initiated by a separate security administrator associated with the central computer platform 110.

In step 330, the MED 130 is accessed via the DMSA 120 and a proposed edited change is made to the MED 130 using an assigned UIC which is associated with the DIC of the MED 130. In accordance with an embodiment of the present invention, accessing the MED 130 is facilitated by the party authority module (PAM) 122 of the DMSA 120 (e.g., comparing the UIC of the accessing party to a list of approved UICs associated with the DIC of the MED 130). Furthermore, in accordance with an embodiment of the present invention, the proposed edited change to the MED 130 is facilitated by the document editing module (DEM) 123 once access to the MED 130 is granted by the PAM 122. Again, the EM 125 facilitates communication between the PAM 122 and the DEM 123 and editing access to the MED 130 by the DEM 123.

In accordance with an embodiment of the present invention, proposed edited changes are tracked by the DMSA 120 based on the unique identifier codes of the parties making the proposed changes. The proposed edited changes are kept track of by the DEM 123 and, in accordance with an embodiment of the present invention, any party of the plurality of parties associated with a particular MED 130 may access and view a history of the tracked proposed changes and see which parties proposed any particular change.

In step 340, it is determined whether or not each party of the plurality of parties having permission to edit the MED 130 has accepted the proposed edited change made in step 330 (e.g., if each UIC has been used to accept the proposed edited change). Step 340 is facilitated by the change approval module (CAM) 124, in accordance with an embodiment of the present invention. It only takes one party to reject (not accept) the proposed edited change for the method 300 to proceed to step 360 where the MED 130 remains unchanged (i.e., the proposed edited change is not formally accepted into the MED 130). In accordance with an embodiment of the present invention, step 360 is facilitated by the CAM 124 communicating with the DEM 123 via the EM 125.

In accordance with an embodiment of the present invention, the accepting and rejecting of proposed changes are tracked by the DMSA 120 based on the unique identifier codes of the parties accepting and rejecting the proposed changes. The accepting and rejecting of the proposed changes are kept track of by the CAM 124 and, in accordance with an embodiment of the present invention, any party of the plurality of parties associated with a particular MED 130 may access and view a history of the tracked accepted and rejected proposed changes and see which parties accepted and rejected any particular proposed change.

If, however, in step 340 each party has accepted the proposed edited change, then in step 350 the proposed edited change is automatically entered into the MED 130 as a formally accepted change. In accordance with an embodiment of the present invention, step 350 is facilitated by the DEM 123 communicating with the CAM 124 via the EM 125. After step 350 or 360, the method 300 proceeds to step 370 where a decision is made to make another proposed edited change or not. If another change is to be made, then the method reverts back to step 330. Step 370 may be initiated by one of the parties using one of the client computers 151-154 to communicate with the central computer platform 110 via the network 140.

In accordance with an embodiment of the present invention, a party may make an electronic copy of the MED 130 using the DMSA 120, where the electronic copy is saved on the central computer platform 110, or where the electronic copy is saved externally to the central computer platform 110 (e.g., on one of the client computers 151-154). However, whenever an electronic copy is made, the embedded document identification code automatically changes within the electronic copy, rendering the electronic copy inaccessible to the plurality of parties for further editing and accepting. For example, the electronic copy may only be accessible to the plurality of parties as a read-only document. The embedded document identification code for the original MED 130 remains unaltered.

As a result, the electronic copy cannot be easily mistaken or deliberately represented as the original MED 130. In this way, a party may make an electronic copy, being representative of the current state of the MED 130 at the time the copy was made, and distribute the copy to various users within the business organization of the party (e.g., via email) for review. However, the MED 130 on the central computer platform 110, with its unalterable embedded document identification code, remains as the only official document which actually matters to the plurality of parties.

Figure 4:
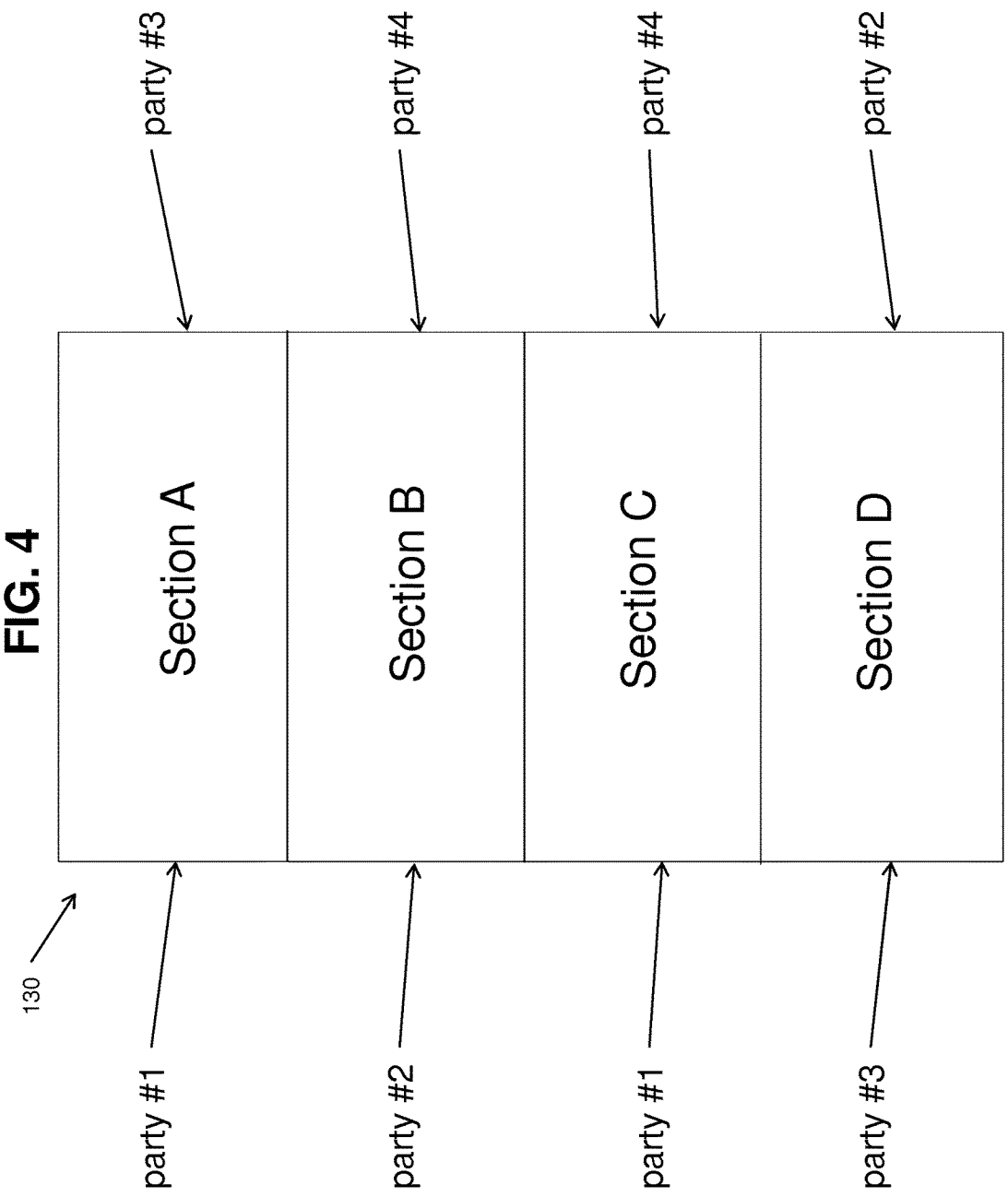
FIG. 4 illustrates a diagram of an example embodiment of a master electronic document (MED) residing on the central computer platform of the system of FIG. 1 which is divided into multiple distinctly defined sections.

FIG. 4 illustrates a diagram of an example embodiment of a master electronic document (MED) 130 residing on the central computer platform 110 of the system 100 of FIG. 1 which is divided into multiple distinctly defined sections A-D. In accordance with an embodiment of the present invention, not only can a unique identifier code (UIC) assigned to a party be associated with the MED 130, but the UIC may also be associated with one or more permitted sections. As a result, a particular party having an assigned UIC may only be able to edit one or more permitted sections of the document and approve or reject proposed changed to those permitted sections.

For example, if there are four parties that have access to the MED 130, the associations and permissions may be as illustrated in FIG. 4. Referring to FIG. 4, party #1 and party #3 have access to section A, party #2 and party #4 have access to section B, party #1 and party #4 have access to section C, and party #3 and party #2 have access to section D. Therefore, the UIC assigned to party #1 provides party #1 with access to sections A and C for the purpose of editing (making proposed changes) and accepting and rejecting proposed changes. Similarly, the UIC assigned to party #2 provides party #2 with access to sections B and D, the UIC assigned to party #3 provides party #3 with access to sections A and D, and the UIC assigned to party #4 provides party #4 with access to sections B and C.

In the DMSA 120, the DAM 121 is used to set up the permissions within the PAM 122 for the various parties. Then the PAM 122 works in conjunction with the DEM 123 and the CAM 124 to prevent a party from accessing a section of the MED 130 which they are not authorized to access, and to allow a party to access a section of the MED 130 which they have permission to access. For example, if the MED 130 is a contract, section A of the MED 130 may be related to DEFINITIONS, section B may be related to INTELLECTUAL PROPERTY RIGHTS, section C may be related to LICENSING, and section D may be related to INDEMNIFICATION. Therefore, for example, only party #2 and party #4 are able to modify and approve section B on INTELLECTUAL PROPERTY RIGHTS.

Figure 5:
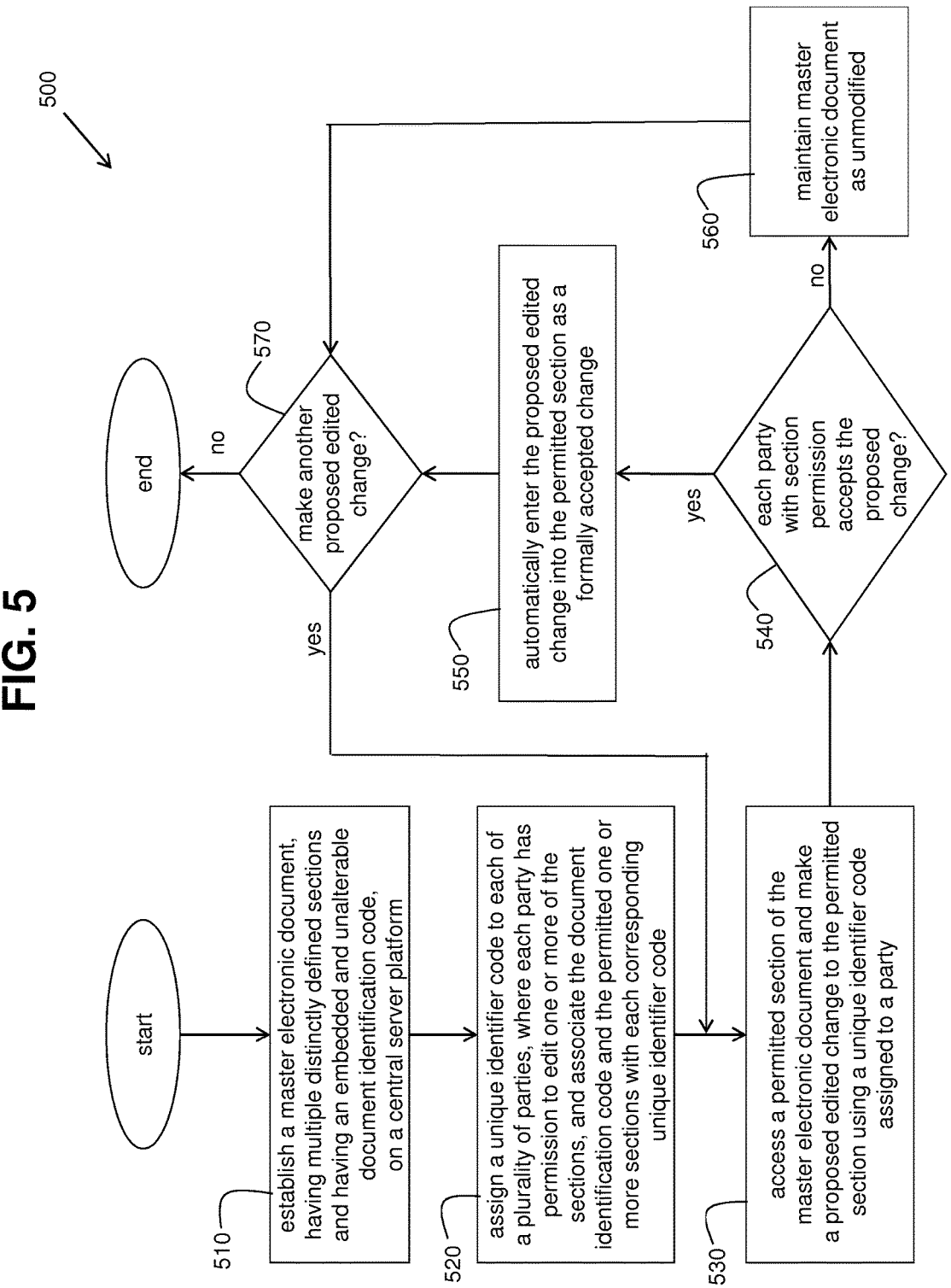
FIG. 5 is a flowchart of an example of a second embodiment of a method of performing multi-party document revision using the DMSA of FIG. 2 operating on the system of FIG. 1.

FIG. 5 is a flowchart of an example of a second embodiment of a method 500 of performing multi-party document revision using the DMSA 120 of FIG. 2 operating on the system 100 of FIG. 1. The method 500 is very similar to the method 300 except that, in the method 500, a party may only have access to one or more sections of the MED 130, not necessarily to the entire document. In step 510, a master electronic document (MED) 130, having multiple distinctly defined sections (e.g., sections A-D of FIG. 4), is established on a central computer platform 110.

In accordance with an embodiment of the present invention, a party having permission to access the MED 130 uses a client computer (e.g., 152) to access the DMSA 120 on the central computer platform 110 via the network 140 and establishes or sets up the MED 130 on the central computer platform 110. Again, the MED 130 has an embedded and unalterable document identification code (DIC). The DIC may be a numeric or alpha-numeric code, for example. Other types of codes are possible as well.

This initial version of the MED 130 may serve as a starting point or a baseline for a contract, for example, to be negotiated between two or more parties, including the party establishing the MED 130. Alternatively, a neutral party, which will not be part of the negotiation, may establish the baseline MED 130 on the central computer platform 110. The neutral party may be, for example, an arbitrator or a legal entity specializing in legal contracts. In accordance with an embodiment of the present invention, the step 510 is facilitated by the document administrator module (DAM) 121 via the executive module (EM) 125, thus establishing the baseline MED 130 with its distinct sections.

In step 520, a unique identifier code (UIC) is assigned to each party of a plurality of parties having permission to edit one or more sections of the MED 130, and the DIC of the MED 130 and the one or more permitted sections is associated with each corresponding UIC. Each party may use their assigned UIC to access the associated MED 130 using the DMSA 120 on the central computer platform 110. In accordance with an embodiment of the present invention, the step 520 is facilitated by the document administrator module (DAM) 121 and the party authority module (PAM) 122 via the executive module (EM) 125, thus establishing which parties have access to which sections of the MED 130. As with step 510, step 520 may be initiated by one of the negotiating parties or by an arbitrator or a legal entity specializing in legal contracts, for example. Alternatively, step 520 may be initiated by a separate security administrator associated with the central computer platform 110.

In step 530, a permitted section of the MED 130 is accessed via the DMSA 120 and a proposed edited change is made to the permitted section of the MED 130 using an assigned UIC which is associated with the DIC of the MED 130. In accordance with an embodiment of the present invention, accessing the permitted section of the MED 130 is facilitated by the party authority module (PAM) 122 of the DMSA 120 (e.g., comparing the UIC of the accessing party to a list of approved UICs associated with the permitted section and the DIC of the MED 130). Furthermore, in accordance with an embodiment of the present invention, the proposed edited change to the permitted section of the MED 130 is facilitated by the document editing module (DEM) 123 once access to the permitted section of the MED 130 is granted by the PAM 122. Again, the EM 125 facilitates communication between the PAM 122 and the DEM 123 and editing access to the MED 130 by the DEM 123.

In accordance with an embodiment of the present invention, proposed edited changes to various sections of the MED 130 are tracked by the DMSA 120 based on the unique identifier codes of the parties making the proposed changes. The proposed edited changes are kept track of by the DEM 123 and, in accordance with an embodiment of the present invention, any party of the plurality of parties associated with a particular permitted section of the MED 130 may access and view a history of the tracked proposed changes to that section and see which parties proposed any particular change to that section.

In step 540, it is determined whether or not each party of the plurality of parties having permission to edit a particular permitted section of the MED 130 has accepted the proposed edited change made in step 530 (i.e., if each UIC associated with the particular section has been used to accept the proposed edited change to the section). Step 540 is facilitated by the change approval module (CAM) 124, in accordance with an embodiment of the present invention. It only takes one party to reject (not accept) the proposed edited change for the method 500 to proceed to step 560 where the MED 130 remains unchanged (i.e., the proposed edited change is not formally accepted into the MED 130). In accordance with an embodiment of the present invention, step 560 is facilitated by the CAM 124 communicating with the DEM 123 via the EM 125.

In accordance with an embodiment of the present invention, the accepting and rejecting of proposed changes to any particular section of the MED 130 are tracked by the DMSA 120 based on the unique identifier codes of the parties accepting and rejecting the proposed changes. The accepting and rejecting of the proposed changes are kept track of by the CAM 124 and, in accordance with an embodiment of the present invention, any party of the plurality of parties associated with a particular permitted section of the MED 130 may access and view a history of the tracked accepted and rejected proposed changes for that section and see which parties accepted and rejected any particular proposed change.

If, however, in step 540 each party having permitted access to the particular section has accepted the proposed edited change, then in step 550 the proposed edited change is automatically entered into the MED 130 as a formally accepted change. In accordance with an embodiment of the present invention, step 550 is facilitated by the DEM 123 communicating with the CAM 124 via the EM 125. After step 550 or 560, the method 500 proceeds to step 570 where a decision is made to make another proposed edited change or not. If another change is to be made, then the method reverts back to step 530. Step 570 may be initiated by one of the parties using one of the client computers 151-154 to communicate with the central computer platform 110 via the network 140.

In accordance with an embodiment of the present invention, a party may make an electronic copy of a permitted section of the MED 130 using the DMSA 120, where the electronic copy is saved on the central computer platform 110, or where the electronic copy is saved externally to the central computer platform 110 (e.g., on one of the client computers 151-154). However, whenever an electronic copy of a permitted section is made, the embedded document identification code automatically changes within the electronic copy, rendering the electronic copy inaccessible to the parties (having permission rights for that section) for further editing and accepting. For example, the electronic copy may only be accessible to the permitted parties as a read-only document. The embedded document identification code for the original MED 130 remains unaltered.

As a result, the electronic copy cannot be easily mistaken or deliberately represented as the original MED 130. In this way, a party may make an electronic copy, being representative of the current state of a particular permitted section of the MED 130 at the time the copy was made, and distribute the copy to various users within the business organization of the party (e.g., via email) for review. However, the MED 130 on the central computer platform 110, with its unalterable embedded document identification code, remains as the only official document which actually matters to the plurality of parties.

In accordance with some alternative embodiments of the present invention, document equivalency may be obtained in documents that are not controlled by a central computer platform. For example, a master electronic document (MED) may be kept on each client computer, and embedded encrypted check sums in the MED may be used to enable parties to verify document revisions and changes. Furthermore, embedded encrypted original versions of the MED may be used by receiving parties to check the equivalency of the documents.

In summary, a system and method providing a multi-party document revision capability are disclosed. A master electronic document (MED) may be established on a central computer platform. The MED is embedded with an unalterable document identification code (DIC) which clearly identifies the single instance of the MED. Parties having permission to access, modify, and approve the MED on the central computer platform are each provided with a unique identifier code (UIC) which is associated with the DIC and, therefore, the MED. Any permitted party having an assigned UIC may access the MED and enter proposed changes to the MED on the central computer platform. However, each party associated with the MED has to approve any proposed change before the proposed change is automatically entered as a formally accepted change into the MED.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A non-transitory computer-readable medium having computer-executable instructions for enabling the performance of a method of multi-party document revision comprising:

establishing a master electronic document, having an embedded and unalterable document identification code;

assigning to each party of a plurality of parties having permission to edit said master electronic document a unique identifier code resulting in a plurality of unique identifier codes, and associating said document identification code with each unique identifier code of said plurality of unique identifier codes;

accessing said master electronic document and making a proposed edited change to said master electronic document using at least one of said unique identifier codes;

for every unique identifier code of said plurality of unique identifier codes, accessing said master electronic document and accepting or rejecting said proposed edited change using said unique identifier codes; and automatically entering said proposed edited change into said master electronic document as a formally accepted change in response to, and only if, every unique identifier code of said plurality of unique identifier codes has accepted said proposed edited change.

2. The non-transitory computer-readable medium of claim 1 wherein said method further comprises making an electronic copy of said master electronic document, wherein said embedded document identification code automatically changes within said electronic copy rendering said electronic copy inaccessible to said plurality of parties for further editing and accepting.

3. The non-transitory computer-readable medium of claim 1 wherein said method further comprises making an electronic copy of said master electronic document, wherein said embedded document identification code automatically changes within said electronic copy rendering said electronic copy accessible to said plurality of parties as a read-only document.

4. The non-transitory computer-readable medium of claim 1 wherein said method further comprises automatically tracking said proposed edited change based on said one of said unique identifier codes used for accessing said master electronic document and for making said proposed edited change.

5. The non-transitory computer-readable medium of claim 1 wherein said method further comprises automatically tracking said accepting or rejecting of said proposed edited change based on said one of said unique identifier codes used for accessing said master electronic document and for accepting or rejecting said proposed edited change.

6. A system for enabling multi-party document revision, said system comprising:

a central computer platform;

means for facilitating the establishment of a master electronic document, having an embedded and unalterable document identification code, on said central computer platform;

means for assigning to each party of a plurality of parties having permission to edit said master electronic document a unique identifier code resulting in a plurality of unique identifier codes and for associating said document identification code with each unique identifier code of said plurality of unique identifier codes;

means for facilitating the accessing of said master electronic document and the making of a proposed edited change to said master electronic document using at least one assigned unique identifier code;

means for facilitating the accessing of said master electronic document and, for every unique identifier code of said plurality of unique identifier codes, the accepting or rejecting of said proposed edited change using said one unique identifier codes; and means for automatically entering said proposed edited change into said master electronic document as a formally accepted change in response to, and only if, every unique identifier code of said plurality of unique identifier codes has accepted said proposed edited change.

7. The system of claim 6 further comprising means for facilitating the making of an electronic copy of said master electronic document, wherein said embedded document identification code automatically changes within said electronic copy rendering said electronic copy inaccessible to said plurality of parties for further editing and accepting.

8. The system of claim 6 further comprising means for facilitating the making of an electronic copy of said master electronic document, wherein said embedded document identification code automatically changes within said electronic copy rendering said electronic copy accessible to said plurality of parties as a read-only document.

9. The system of claim 6 further comprising means for automatically tracking said proposed edited change based on said assigned unique identifier code used for accessing said master electronic document and for making said proposed edited change to said master electronic document.

10. The system of claim 6 further comprising means for automatically tracking said accepting or rejecting of said proposed edited change based on said unique identifier code used for accessing said master electronic document and for accepting or rejecting said proposed edited change.

11. A non-transitory computer-readable medium having computer-executable instructions for enabling the performance of a method of multi-party document revision comprising:

establishing a master electronic document, having an embedded and unalterable document identification code;

assigning to each party of a plurality of parties having permission to edit said master electronic document a unique identifier code resulting in a plurality of unique identifier codes, and associating said document identification code with each unique identifier code of said plurality of unique identifier codes;

accessing said master electronic document and making a proposed edited change to said master electronic document using at least one of said unique identifier codes;

for every unique identifier code of said plurality of unique identifier codes, accessing said master electronic document and making an affirmative indication as to whether said proposed edited change is rejected using said unique identifier codes; and automatically entering said proposed edited change into said master electronic document as a formally accepted change in response to, and only if, every unique identifier code of said plurality of unique identifier codes has been used to make an affirmative indication as to whether said proposed edited change is rejected and no unique identifier code has been used to reject said proposed edited change.

\* \* \* \* \*